W. L. MONRO.
GLASS CUTTER.
APPLICATION FILED MAR. 13, 1908.

1,124,784.

Patented Jan. 12, 1915.

3 SHEETS—SHEET 1.

Witness:
Chas. S. Lipley.
Fred Stout.

Inventor;
William L. Monro
By J.W.H. Clay
att.

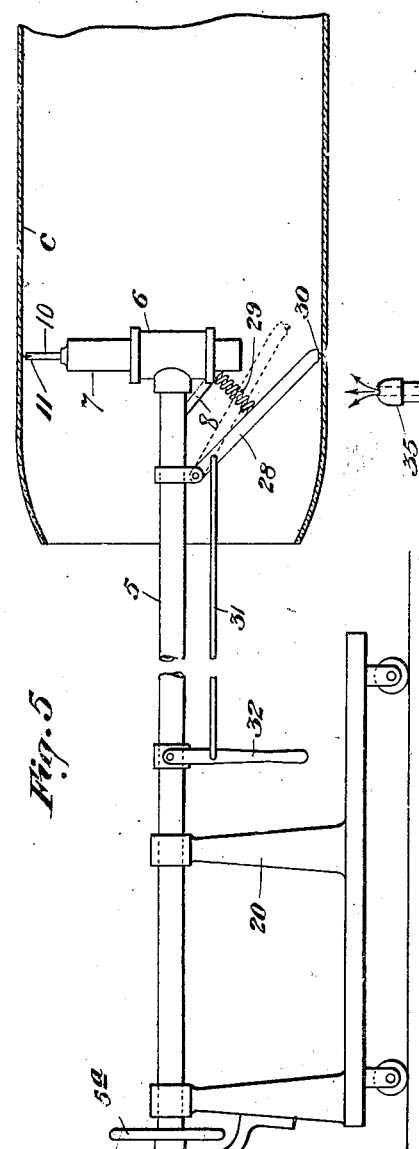
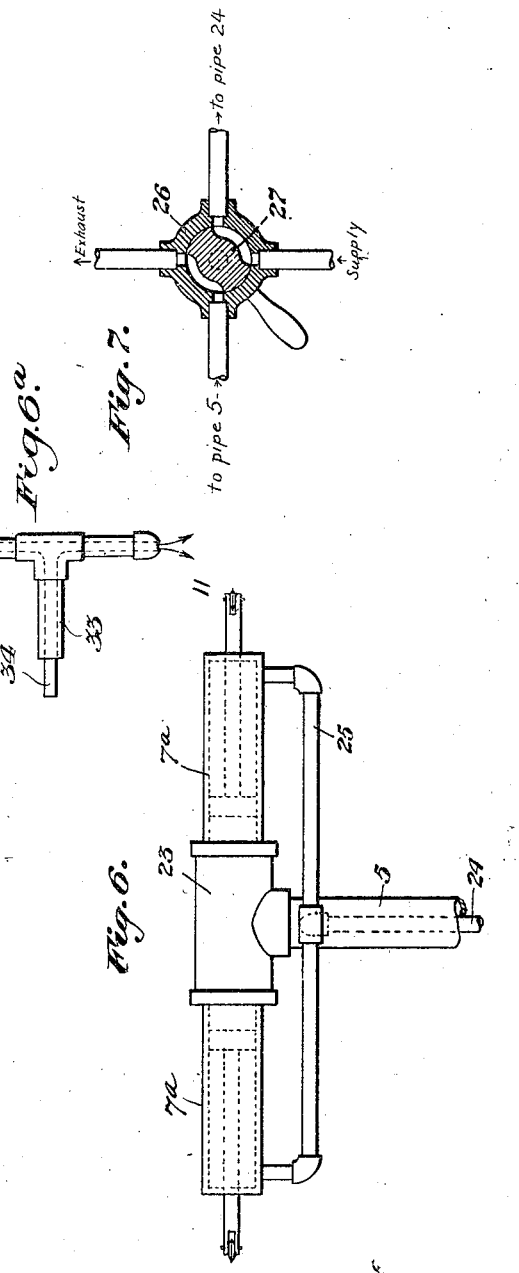

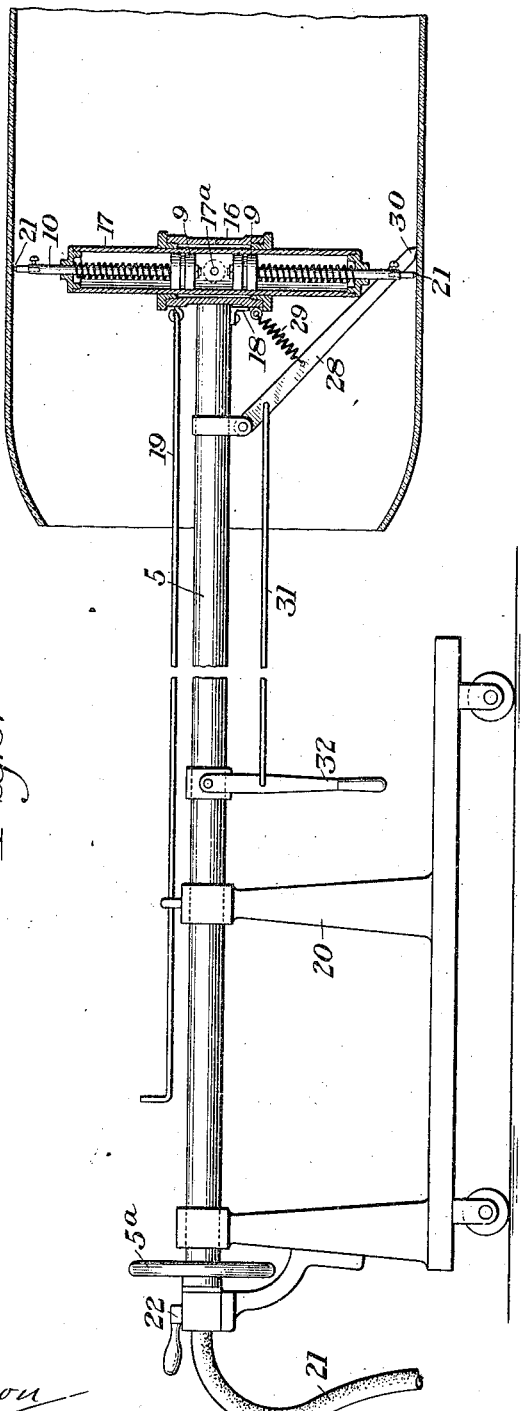

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

GLASS-CUTTER.

1,124,784.  Specification of Letters Patent.  Patented Jan. 12, 1915.

Application filed March 13, 1908. Serial No. 420,990.

*To all whom it may concern:*

Be it known that I, WILLIAM L. MONRO, a citizen of the United States, residing at Pittsburgh, in the State of Pennsylvania, have invented certain new and useful Improvements in Glass-Cutters, of which the following is a specification.

My invention relates particularly to means for cutting round articles such as the cylinders made for window glass, and its primary object is to provide means for cutting and slitting from the interior in any desired position and to properly regulate the pressure on the cutting tool, as well as to properly balance the cutting tool in place and otherwise improve its construction and operation as will hereinafter appear.

In the accompanying drawings I have shown for illustration several forms of the invention.

Figure 1:
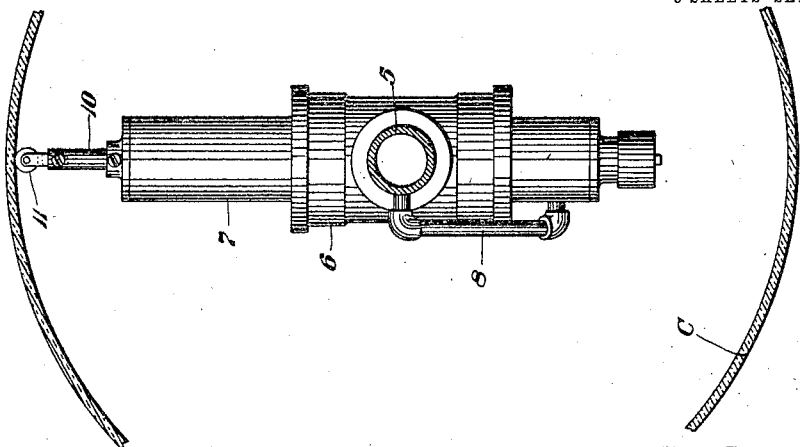
Figure 2:
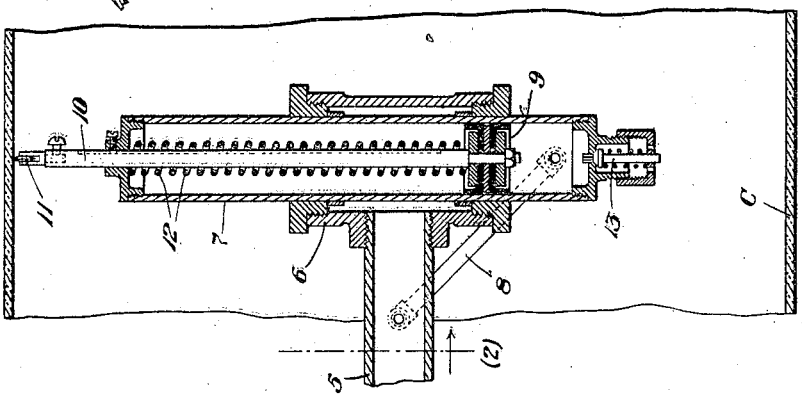
Figure 3:
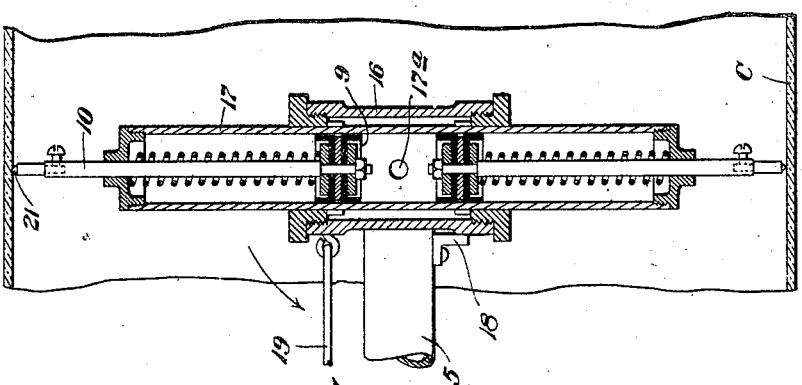
Figure 4:
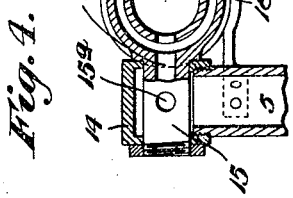

Figure 1 shows a partial cross-section of a large glass cylinder and an elevation of the cutter and operating means therein, the plane of section being on the dotted line (2) of Fig. 2. Fig. 2 shows a vertical section through the cutter actuating cylinder and support. Fig. 3 is a similar section of another form of cylinder; Fig. 4 is a horizontal section through the center of Fig. 3; Fig. 5 shows the mode of mounting, and also a slitting cutter; Fig. 6 shows another form of cylinder; Fig. 6ª shows still another modification in which a flame is used as the cutting tool; and Fig. 7 a convenient form of operating valve; Fig. 8 is a view partly in side elevation and partly in vertical section, and showing the mounting for the form of my invention illustrated in Figs. 3 and 4.

Heretofore in the flattening of large cylinders of glass, it has been customary to cut the cylinder into lengths by a hot wire or string of glass applied to the external surface, and this largely because it was difficult to operate on the inside of the cylinder. And the present methods of cutting do not sever the cylinder along a true circle and are uncertain, slow and cumbersome. By my invention I cut the glass on a true circle with a diamond or roller or heat jet, etc., and may operate on cylinders of irregular form. I also provide means for efficiently slitting the cylinder. Thus in Figs. 1, 2 and 5, I provide a long and rigidly supported tube 5 which extends into the cylinder to the desired position and is mounted to be revolved and moved longitudinally in any way that may be convenient, as by mounting in suitable supports 20 and providing a handle 5ª, whereby the device may be rotated (see Fig. 5). On the end of the pipe 5 in a coupling 6 I fix a small cylinder 7 into which compressed air or steam may be introduced through the pipe 5 by means of the connecting pipe 8. The cylinder has a piston 9, whose stem 10 carries at the outer end a cutting tool 11, such as a roller. The piston is normally held and withdrawn by means of a spring 12, and is thrust out to make contact with the glass cylinder C with any pressure desired, by means of the air introduced through pipe 8. Preferably I use an escape valve 13 in order to avoid the possibility of the pressure on the tool becoming too great if the cylinder should be irregular and force it inward against the air pressure behind the cylinder.

It will be understood that for operation the supporting pipe 5 is placed approximately in the center of the cylinder C and then air being introduced behind the piston, the tool 11 makes contact with the cylinder. Thereupon the pipe 5 is rotated to cut the glass in a complete circle.

In order to more perfectly center the cutting tool, and provide for better balancing the pressure and making it unnecessary to turn the tool through more than 180 degrees, I sometimes use the device as shown in Figs. 3 and 4, which is also designed to more easily introduce the cutter into cylinders having small openings at the end. On the end of the supporting pipe 5 mounted in any convenient bearings, I provide a swivel joint comprising the casing 14 and hollow stem 15 of the cylinder casing 16. In the casing 16 is mounted a cylinder 17 which communicates with the pipe 5 through the openings 17ª and 15ª. It will be seen that the cylinder 17 can thus turn on a pivot until it is alined with the pipe 5. This may be conveniently done by means of a rod 19, and a stop 18 is provided in order to hold the cylinder 17 exactly perpendicular to the pipe 5 when in operative position.

The pistons 9 are subjected to the same air or steam pressure introduced through the port 17ª, and they thrust outward the two rods 10 carrying diamond points 21 or rollers, as in the first described modification.

The cylinder 17 being turned into line with the supporting pipe 5 by means of rod 19, which may be easily inserted into the cylinder C to the desired point where the cut is to be made. By thrusting on the rod 19 the cylinder is then righted up in perpendicular position and the air being introduced the cutters 21 are pressed against the glass on the two opposite points on the cylinder and they engage the cylinder with the same pressure thus balancing the tool in the center. On giving the pipe 5 a half revolution the cut is made when by a slight tap the cylinder will be separated, as will be understood.

In Fig. 8 I have shown the complete mounting for the device of Figs. 3 and 4. This mounting is substantially the same as that shown in Fig. 5.

By means of this device an internal cut can be made with uniform pressure and in a correct line and a cylinder can be cut up into lengths for flattening into sheets without waste of glass. Of course by omitting one of the tools 21 and drawing the other tool along the length the cylinder also can be split as will be understood. But I prefer to use the special slitting cutter shown in Fig. 5 and also in Fig. 8. On the longitudinal sliding pipe 5 is pivoted an arm 28 which carries a diamond point scoring tool 30 and is normally held in raised position by retractile spring 29. After the circular cut has been made the cutter 30 is drawn down by means of a link 31 and handle 32, and then by merely drawing the tool longitudinally of the cylinder the cut is made.

In Fig. 6 is shown an alternative means of operating the cutters balanced as in Fig. 3. I prefer rather than using the spring return, to provide a supplementary air pipe 24 which may conveniently be placed inside the pipe 5, and it has two branches 25 which connect with a cylinder in front of the pistons 9. The casing 23 is supplied directly from pipe 5 as in Fig. 3. When the cutting operation is finished the cutting tools 11 are withdrawn by exhausting the air between the pistons in the casing 23 through the pipe 5 and admitting air through pipe 24 in front of the pistons, as indicated in Fig. 6. A convenient form of four-way valve for this purpose is shown in Fig. 7 where the casing 26 has four connections indicated, and the revolving plug 27 operates all four passages as will be evident. This valve may be placed in any convenient position, as in place of the valve 22 shown in Fig. 5, and connected to the hose 21.

I do not desire to limit myself to the particular constructions which I have herein shown and described, since it is obvious that these constructions may be modified in various ways without departing from the spirit and scope of my invention as defined in the claims. It is also to be understood that I am not limited to any particular cutting means but may use jets of flame in place of the cutters 11 and 21, etc., as shown in Fig. 6ª where 33 is an air pipe, 34 a gas pipe and 35 two jet burners in the usual blowpipe form.

Having thus described my invention and illustrated its use, what I claim as new and desire to secure by Letters Patent, is the following:

1. A device for operating upon the inside of a hollow glass cylinder, comprising a rotatable member, a support on which said member is mounted for horizontal longitudinal movement and also for rotation, and a cutting tool carried by said member, and rotatable therewith about the axis of the glass cylinder, said support being independent of the cylinder to be cut; substantially as described.

2. A device for operating upon the inside of a hollow glass cylinder, comprising a horizontally movable supporting truck, a hollow pipe member rotatably supported thereon, and a cutting tool carried by said member and rotatable therewith about the axis of the glass cylinder; substantially as described.

3. A cutter for glass cylinders comprising a revoluble support and a pivoted cylinder thereon, provided with two pistons having rods with cutting tools, the cylinder being thereby adapted to act on both tools and to fold on its support together with means for supplying a motive fluid to the cylinder, substantially as described.

4. A device for operating upon the inside of a hollow glass cylinder, comprising a rotatable member, a cylinder pivotally connected thereto, a piston in said cylinder, a cutting tool carried by the cylinder, means for admitting motive fluid to the cylinder, and means for changing the angular relation between the cylinder and member; substantially as described.

5. The combination with a rotatably mounted supporting pipe and a fluid supply, of a cylinder pivoted on said pipe and supplied with fluid therefrom, two pistons in the cylinder and cutting tools on their rods, substantially as described.

6. A device for operating upon the inside of a glass cylinder, comprising a rotatable, longitudinally movable member, a radially movable cutting tool carried by said member to be rotated therewith, a longitudinally acting cutting tool also carried by said member, and means for moving the last named tool into and out of cutting position; the two cutting tools being at different angles, substantially as described.

7. A device for operating on the inside of a cylindrical glass article, comprising a rotatable hollow support adapted for connection with a source of fluid pressure supply at one end, a cylinder having a pivoted connection with the other end of said support, said cylinder also having a supply connection with the hollow support, a piston in said cylinder, and a severing tool carried by the piston; substantially as described.

8. A device for operating on the inside of a cylindrical glass article, comprising a rotatable hollow support adapted for connection with a source of fluid pressure supply at one end, a cylinder having a pivoted connection with the other end of said support, and also a supply connection with the said support, a piston in said cylinder, and a severing tool carried by the piston together with means for engaging said cylinder for turning it on its pivot; substantially as described.

In testimony whereof I have hereunder signed my name in the presence of the two subscribed witnesses.

WILLIAM L. MONRO.

Witnesses:
ALICE A. TRILL,
HARRY O. HEMMICK.